United States Patent
Diab et al.

(10) Patent No.: US 7,989,976 B2
(45) Date of Patent: Aug. 2, 2011

(54) SYSTEM AND METHOD FOR CONTROLLING A POWER BUDGET AT A POWER SOURCE EQUIPMENT USING A PHY

(75) Inventors: Wael William Diab, San Francisco, CA (US); Nariman Yousefi, Dana Point, CA (US); Kevin Clyde Brown, Long Beach, CA (US)

(73) Assignee: Broadcom Corporation, Irvine, CA (US)

( * ) Notice: Subject to any disclaimer, the term of this patent is extended or adjusted under 35 U.S.C. 154(b) by 541 days.

(21) Appl. No.: 11/653,274

(22) Filed: Jan. 16, 2007

(65) Prior Publication Data

US 2008/0172564 A1    Jul. 17, 2008

(51) Int. Cl.
*G06F 1/26*    (2006.01)
(52) U.S. Cl. ............................... 307/2; 307/3
(58) Field of Classification Search .................. 307/103, 307/2, 3; 322/21; 340/310.15
See application file for complete search history.

(56) References Cited

U.S. PATENT DOCUMENTS

| | | | |
|---|---|---|---|
| 6,125,048 A * | 9/2000 | Loughran et al. | ................ 363/78 |
| 7,170,194 B2 * | 1/2007 | Korcharz et al. | ................ 307/21 |
| 7,356,588 B2 | 4/2008 | Stineman et al. | |
| 7,363,525 B2 | 4/2008 | Biederman et al. | |
| 7,404,091 B1 | 7/2008 | Gere | |
| 7,445,507 B1 | 11/2008 | Parker | |
| 7,478,251 B1 | 1/2009 | Diab et al. | |
| 7,603,570 B2 | 10/2009 | Schindler et al. | |
| 2005/0102419 A1 | 5/2005 | Popescu et al. | |
| 2005/0262364 A1 | 11/2005 | Diab et al. | |
| 2006/0149978 A1 * | 7/2006 | Randall et al. | ................ 713/300 |
| 2007/0113105 A1 | 5/2007 | Campbell et al. | |

* cited by examiner

*Primary Examiner* — Fritz M Fleming
(74) *Attorney, Agent, or Firm* — Duane S. Kobayashi

(57) ABSTRACT

A system and method for controlling the delivery of power to a powered device in a Power over Ethernet Broad Reach (PoE-BR) application. Cabling power loss in a PoE-BR application is related to the resistance of the cable itself. A PHY can be designed to measure electrical characteristics (e.g., insertion loss, cross talk, length, etc.) of the Ethernet cable to enable determination of the cable resistance. The determined resistance in a broad reach cable can be used in increasing a power budget allocated to a power source equipment port.

11 Claims, 5 Drawing Sheets

US 7,989,976 B2

SYSTEM AND METHOD FOR CONTROLLING A POWER BUDGET AT A POWER SOURCE EQUIPMENT USING A PHY

BACKGROUND

1. Field of the Invention

The present invention relates generally to Power over Ethernet (PoE) systems and methods and, more particularly, to the control of power delivered to a powered device.

2. Introduction

The IEEE 802.3af PoE standard provides a framework for delivery of power from power source equipment (PSE) to a powered device (PD) over Ethernet cabling. In this PoE process, a valid device detection is first performed. This detection process identifies whether or not it is connected to a valid device to ensure that power is not applied to non-PoE capable devices.

After a valid PD is discovered, the PSE can optionally perform a power classification. IEEE 802.3af defines five power classes for a PD device. The completion of this power classification process enables the PSE to manage the power that is delivered to the various PDs connected to the PSE. If a particular power class is identified for a particular PD, then the PSE can allocate the appropriate power for that PD. If power classification is not performed, then a default classification can be used where the PSE supplies the full 15.4 W of power onto the particular port.

Management of the power budgets that are allocated to the various PDs connected to the PSE is crucial for efficient operation of the PSE. Management of power budgets are even more critical in a PoE Broad Reach (PoE-BR) application where the PD is connected to the PSE using an Ethernet cable greater than 100 meters (e.g., 300-500 meters). In general, the total amount of power that can be allocated to the various PDs is limited by the capacity of the PSE. Thus, what is needed is a mechanism that enables the PSE to identify an accurate amount of power that should be budgeted on each port.

SUMMARY

A system and/or method for controlling power delivered to powered devices, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
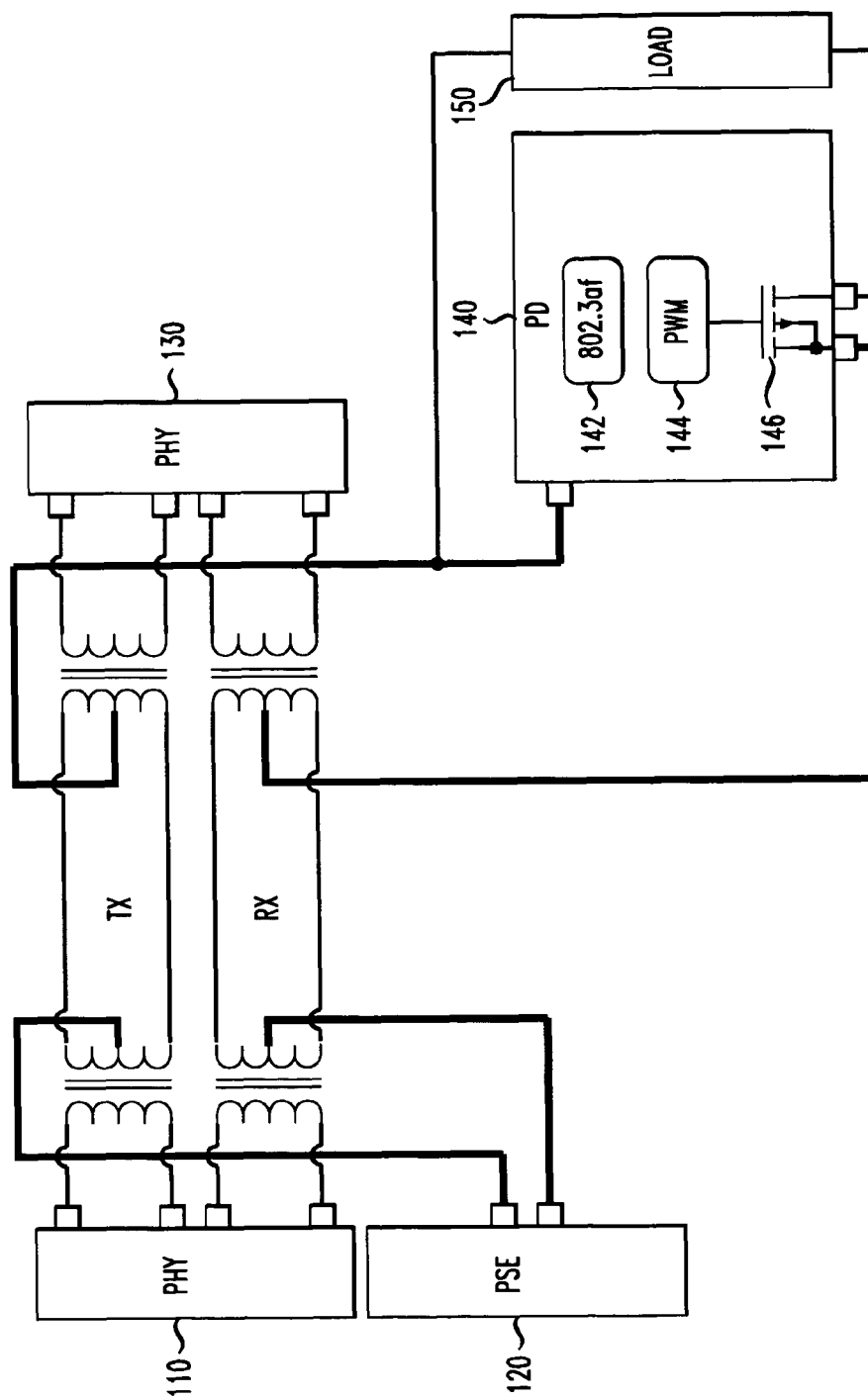
FIG. 1 illustrates an embodiment of a Power over Ethernet (PoE) system.

FIG. 1 illustrates an embodiment of a power over Ethernet (PoE) system. As illustrated, the PoE system includes power source equipment (PSE) 120 that transmits power to powered device (PD) 140. Power delivered by the PSE to the PD is provided through the application of a voltage across the center taps of transformers that are coupled to a transmit (TX) pair and a receive (RX) pair of wires carried within an Ethernet cable. The two TX and RX pairs enable data communication between Ethernet PHYs 110 and 130.

As is further illustrated in FIG. 1, PD 140 includes 802.3af module 142. This module includes the electronics that would enable PD 140 to communicate with PSE 120 in accordance with the IEEE 802.3af standard. PD 140 also includes pulse width modulation (PWM) DC:DC controller 144 that controls power FET 146, which in turn provides constant power to load 150. In general, there are two types of loads: a purely resistive load (e.g., lamp) and a constant power load that is fed by a DC:DC power controller. The present application is primarily directed to constant power loads fed by a DC:DC power controller.

Figure 2A:
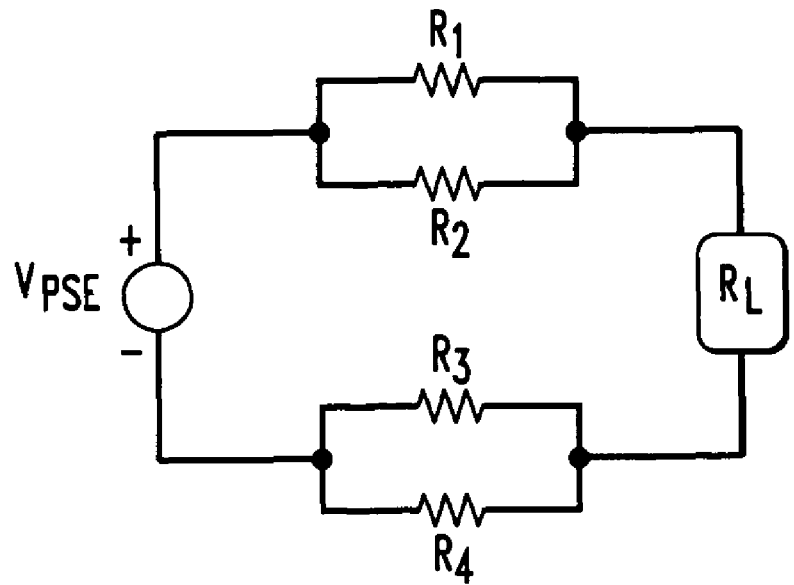
FIGS. 2A and 2B illustrate circuit diagrams that model the PoE system.

The delivery of power from PSE 120 to load 150 can be modeled by the circuit model illustrated in FIG. 2A. As illustrated, a power source provides a voltage $V_{PSE}$ to a circuit that includes a first parallel pair of resistors ($R_1$, $R_2$), a load resistance $R_{LOAD}$, and a second parallel pair of resistors ($R_3$, $R_4$). Here, the first parallel pair of resistors $R_1$, $R_2$ represents the resistances of the TX pair of wires, while the second parallel pair of resistors $R_3$, $R_4$ represents the resistances of the RX pair of wires.

Figure 2B:
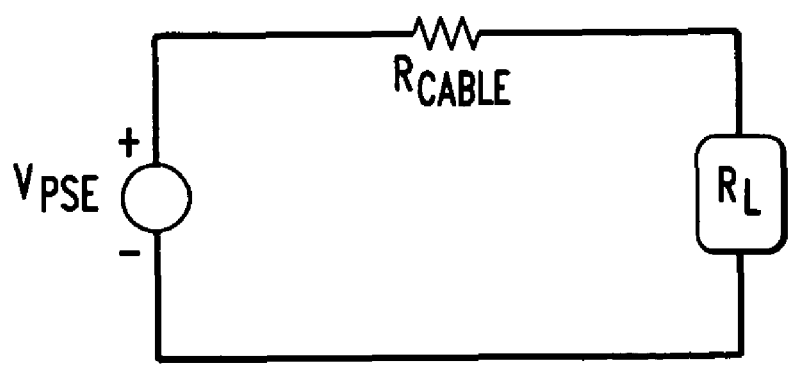

The values of resistors $R_1$, $R_2$, $R_3$, and $R_4$ depend on the type and length of Ethernet cable. Specifically, the resistors $R_1$, $R_2$, $R_3$, and $R_4$ have a certain resistance/length that is dependent on a type of Ethernet cable (e.g., Category 3, 5, 6, etc.). For example, for Category 5 Ethernet cable, resistors $R_1$, $R_2$, $R_3$, and $R_4$ would have a resistance of approximately 0.1Ω/meter. Thus, for a 100-meter Category 5 Ethernet cable, each of resistors $R_1$, $R_2$, $R_3$, and $R_4$ would have a value of 10Ω. In this example, parallel resistors $R_1$ and $R_2$ would have an equivalent resistance of 5Ω, while parallel resistors $R_3$ and $R_4$ would also have an equivalent resistance of 5Ω. In combination, the total value of the Ethernet cable resistance ($R_{cable}$) can then be determined as the sum of 5Ω+5Ω=10Ω. A simplified PoE circuit model that includes the single cable resistance value $R_{cable}$ is illustrated in FIG. 2B. As noted above, the resistance $R_{cable}$ for Category 5 cable is approximately 0.1Ω/meter. For 100 meters of Category 5 cable, the resistance $R_{cable}$ is therefore 10Ω.

In the IEEE 802.3af standard, a PSE can optionally perform a classification step that identifies a power classification of the PD. Table 1 below shows the five PD classes supported by the IEEE 802.3af standard.

TABLE 1

| Class | Usage | Min Power Output by PSE | Max Power Input at PD |
|---|---|---|---|
| 0 | Default | 15.4 W | 0.44 to 12.95 W |
| 1 | Optional | 4.0 W | 0.44 to 3.84 W |
| 2 | Optional | 7.0 W | 3.84 to 6.49 W |
| 3 | Optional | 15.4 W | 6.49 to 12.95 W |
| 4 | Reserved | Act as Class 0 | Reserved |

As illustrated, the Class 0 (default) and Class 3 PD classifications specify the PSE's minimum output power as 15.4 W. For lower power PDs such as Class 1 and Class 2 devices, the PSE's minimum output power is specified as 4.0 W and 7.0 W, respectively. While optional, the identification of the correct PD power classification enables the PSE to budget only as much power as is needed on each port. This effectively increases the capacity of the PSE in supplying power to a set of connected PDs.

It is a feature of the present invention that the measurement of one or more characteristics of the Ethernet cable can be used to impact the operation of the PoE system. In one embodiment, the measured characteristics are used to identify a type and length of Ethernet cable. The identified type and length of the Ethernet cable can then be used to estimate the resistance of the Ethernet cable. In turn, the estimated resistance of the Ethernet cable can be used to assess power losses in the cable, which impacts the power budget that is allocated for a particular PSE port.

Figure 3:
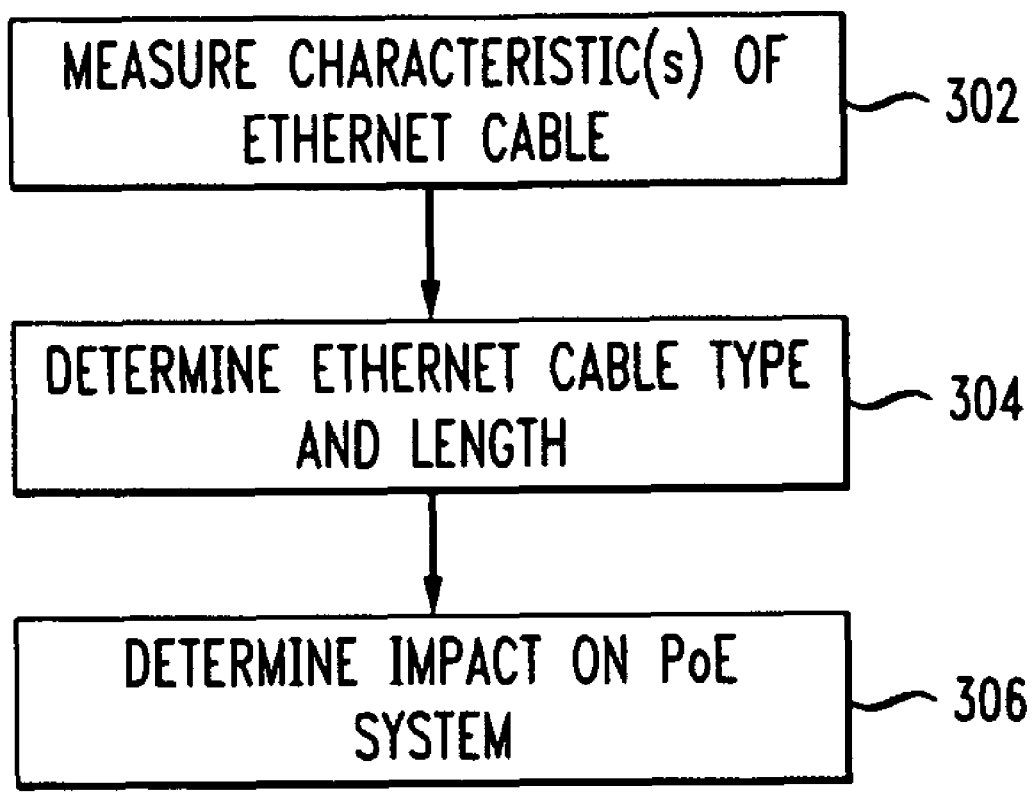
FIG. 3 illustrates a flowchart of a PoE process.

To illustrate this general process of the present invention, reference is made to the flowchart of FIG. 3. As illustrated, the process begins at step 302, where one or more characteristics of an Ethernet cable are measured. In one embodiment, this measurement step can be implemented as part of the PHY's analysis of the electrical characteristics of the Ethernet cable. For example, the measurement step can be implemented as part of an echo cancellation convergence process implemented by the PHY.

In one embodiment, the one or more characteristics of the Ethernet cable that are measured at step 302 are those characteristics that would enable the PoE system to better estimate the resistance of the Ethernet cable. Here, the estimate of the actual cable resistance would enable the PoE system to estimate the actual power loss of the cable. In one embodiment, the PHY is designed to measure characteristics that would enable a determination of the insertion loss, cross talk, and length of the Ethernet cable.

At step 304, after the one or more characteristics of the Ethernet cable are measured, the PoE system would then determine a type and length of Ethernet cable. The Ethernet cable type can be determined based on the measured insertion loss, cross talk, and length of the Ethernet cable. These measurements of the Ethernet cable would enable the PoE system to determine, for example, whether the Ethernet cable is a Category 3, 5, 6, or 7 Ethernet cable.

As would be appreciated, the different cable types have different resistances associated therewith. As noted, Category 3 Ethernet cable has a resistance of approximately 0.2%/meter, while Category 5 Ethernet cable has a resistance of approximately 0.1Ω/meter. Once the type and length of Ethernet cable is identified at step 304, the PoE system can then determine its impact on the PoE system at step 306.

As will be described in greater detail below, the particular impact on the PoE system can vary depending on the application. Here, it is a feature of the present invention that the cable type and length can be used by the PoE system in a dynamic configuration or operation process. For example, the cable type and length can be used to determine an adjustment to a power budget for a given PSE port.

In a PoE-BR application, the PD can be connected to the PSE with more than 100 m of Ethernet cable. For example, a PoE-BR application can be defined to support distances up to 500 m or beyond. In this environment, the cable type and length can have a significant impact on the PoE-BR system.

In the circuit model of FIG. 2B, where the PD includes a DC:DC converter, the load $R_L$ would receive constant power, $P_L$, and see a voltage $V_L$ on its input. Since $P_L$ is fixed at the load, $P_L=I*V_L$, where I is the current going through the whole circuit. The power loss of the cable would then be $P_{loss}=I^2*R_{cable}$.

In specifying the minimum output power of 15.4 W for the PSE, the IEEE 802.3af standard assumes a worst-case link resistance of 20Ω when the PD is connected to the PSE using 100 m of Category 3 cable. At a current limit of 350 mA, the worst-case power loss attributed to the cable is $P_{loss}=(350$ $mA)^2*20Ω=2.45$ W. This worst-case power loss of 2.45 W is the difference between the PSE's minimum output power and the max power drawn by the PD (i.e., 15.4 W−12.95 W=2.45 W).

In general, the increase in distance between the PSE and PD (e.g., 500 m and beyond) creates a greater range of potential operation in a PoE-BR system. This range of operation makes it increasingly difficult to provide system specifications using worst-case operating parameters. For example, assume that up to 500 m of Category 3 cable is supported by the PoE-BR specification. In addressing this scenario, the resistance of the cable would have a range of 20Ω-100Ω. If the 100Ω worst-case cable resistance is assumed then it would be impractical in identifying power budgets such as that listed in Table 1.

Specifically, a worst-case resistance of 100Ω would lead to a worst-case cable power loss of $P_{loss}=(350$ $mA)^2*100Ω=12.25$ W. This worst-case cable power loss would then require that 12.95 W+12.25 W=25.2 W be allocated to each port that has a Class 3 or Class 0 Default PD classification.

It is therefore a feature of the present invention that the power budget allocated to a PoE-BR PSE port can be dynamically changed based on an analysis of the Ethernet cabling coupled to that port. In one embodiment, the characteristics of the Ethernet cabling is used to dynamically increase a specified power budget based on the characteristics of the cable.

To illustrate this feature of the present invention assume that a PoE-BR PSE would budget 15.4 W for a port that is connected to a Class 3 PD. Here, it should be noted that while the PoE-BR PSE's power budgets would likely be increased to accommodate the broad reach application, it has been kept the same as standard PoE power budgets for illustration purposes.

In this context, assume that it is determined that a PD is connected via 200 m of Category 5 cabling. In this case, the resistance of the cable would be approximately 20Ω. Across the cable, the voltage drop can be defined as $V_{PSE}-V_L=I*R_{cable}$. This equation can be solved for the voltage $V_L$ allowed at the PD as follows:

$$V_{PSE}-V_L=I*R_{cable}$$

$$V_{PSE}-V_L=(P_L/V_L)*R_{cable}$$

$$V_{PSE}*V_L-V_L^2=P_L*R_{cable}$$

$$V_L^2-V_{PSE}*V_L+P_L*R_{cable}=0$$

$$V_L=[V_{PSE}+/-SQRT(V_{PSE}^2-(4*P_L*R_{cable}))]/2$$

If $V_{PSE}$ is known to be 50V, $P_L$ is 12.95 W (max power allowed for Class 3 PD), and $R_{cable}=20\Omega$, then $V_L=(50+/-\text{SQRT}(50^2-4*12.95*20))/2=(50+/-38.26)/2=44.13V$. The current can then be calculated using $V_{PSE}-V_L=I*R_{cable}$, such that $50V-44.13V=I*20\Omega$ results in $I=0.294$ A. The total power output by the PSE is then 12.95 W plus the power loss in the cable. The power loss in the cable in this case is $I^2*R_{cable}=(0.294 A)^2*20\Omega=1.73$ W. The total power budget attributed to the PSE port in this example would be 12.95 W+1.73 W=14.68 W. In this example, the total power output by the PSE is within the 15.4 W power budget, so no adjustment would be necessary.

If, on the other hand, it is determined that the PSE is connected to the PD via 400 m of Category 5 cable, then the cable resistance would be approximately 40Ω. The voltage at the PD would then be calculated as $V_L=(50+/-\text{SQRT}(50^2-4*12.95*40))/2=(50+/-20.69)/2=35.34V$. The current can then be calculated using $V_{PSE}-V_L=I*R_{cable}$, such that $50V-35.34V=I*40\Omega$ results in $I=0.366$ A. The total power output by the PSE is then 12.95 W plus the power loss in the cable. The power loss in the cable in this case is $I^2*R_{cable}=(0.366 A)^2*40\Omega=5.36$ W. The total power budget attributed to the PSE port in this example would then be 12.95 W+5.36 W=18.31 W. In this example, the total power output by the PSE is greater than the 15.4 W power budget. Here, an adjustment would then be made at the PSE. Specifically, the power budget allocated to that port would be dynamically increased to accommodate the 18.31 W output power. In one embodiment, this dynamic change could be effected through a new current limit on that port.

In another example, assume that $P_L$ is 12.95 W, $R_{cable}$ is determined to be 60Ω (300 m of Category 3 cable), and $V_L$ is known to be 40V. As would be appreciated, $V_L$ can be communicated from the PD to the PSE using various communication means, such as some form of layer 2 communication. In this case, the current I can be calculated using $I=P_L/V_L=12.95 W/40V=0.323$ A. In this case, the estimated power loss of the cable is $I^2*R_{cable}=(0.323 A)^2*60\Omega=6.26$ W, which can then be used to estimate the total power budget of 12.95 W+6.26 W=19.21 W. Here again, an adjustment would be made at the PSE, wherein the power budget allocated to that port would be dynamically increased to accommodate the 19.21 W output power.

As demonstrated, the power budget attributable to the port can vary widely due to the range of distances being served by the PoE-BR application. To accommodate such a range of distances, and hence cable power losses, a dynamic adjustment mechanism is provided that ensures that a power budget on a port is increased only when it is needed. This is in sharp contrast to conventional systems that provide a worst-case power budget allocation to a port, thereby ensuring that unused power capacity is unnecessarily kept in reserve.

As noted above, one or more characteristics of the Ethernet cable are measured to enable the PoE system to estimate the resistance of the Ethernet cable, and ultimately to estimate the actual power loss of the Ethernet cable. To facilitate such an estimate, the PoE system can measure such characteristics as the insertion loss, cross talk, length, etc. of the Ethernet cable. The measurement of the insertion loss, cross talk, and length of the Ethernet cable represents one example of the characteristics that can be used to estimate the cable resistance, and hence the power loss in the cable.

In one embodiment, cable length can be determined directly using TDR. In an alternative embodiment, cable length can be determined indirectly based on data generated in the measurement of insertion loss using a round trip of the injected signal. Here, the time interval between launching and receiving the pulse(s) is linearly proportional to the cable length. The cable length can then be computed by multiplying the propagation speed with the time interval, then divided by two to account for the round-trip delay.

As has been described, various cable characteristics can be used to determine a cable type and length. These factors enable a determination of the resistance and power loss of the cable. As would be appreciated, other characteristics beyond those described above could also be used to enable the PoE system to determine the resistance and power loss of the cable. Regardless of the measurement data that is used, it is significant that the PoE system can use the data to adjust some aspect of configuration or operation of the PoE system dynamically.

Figure 4:
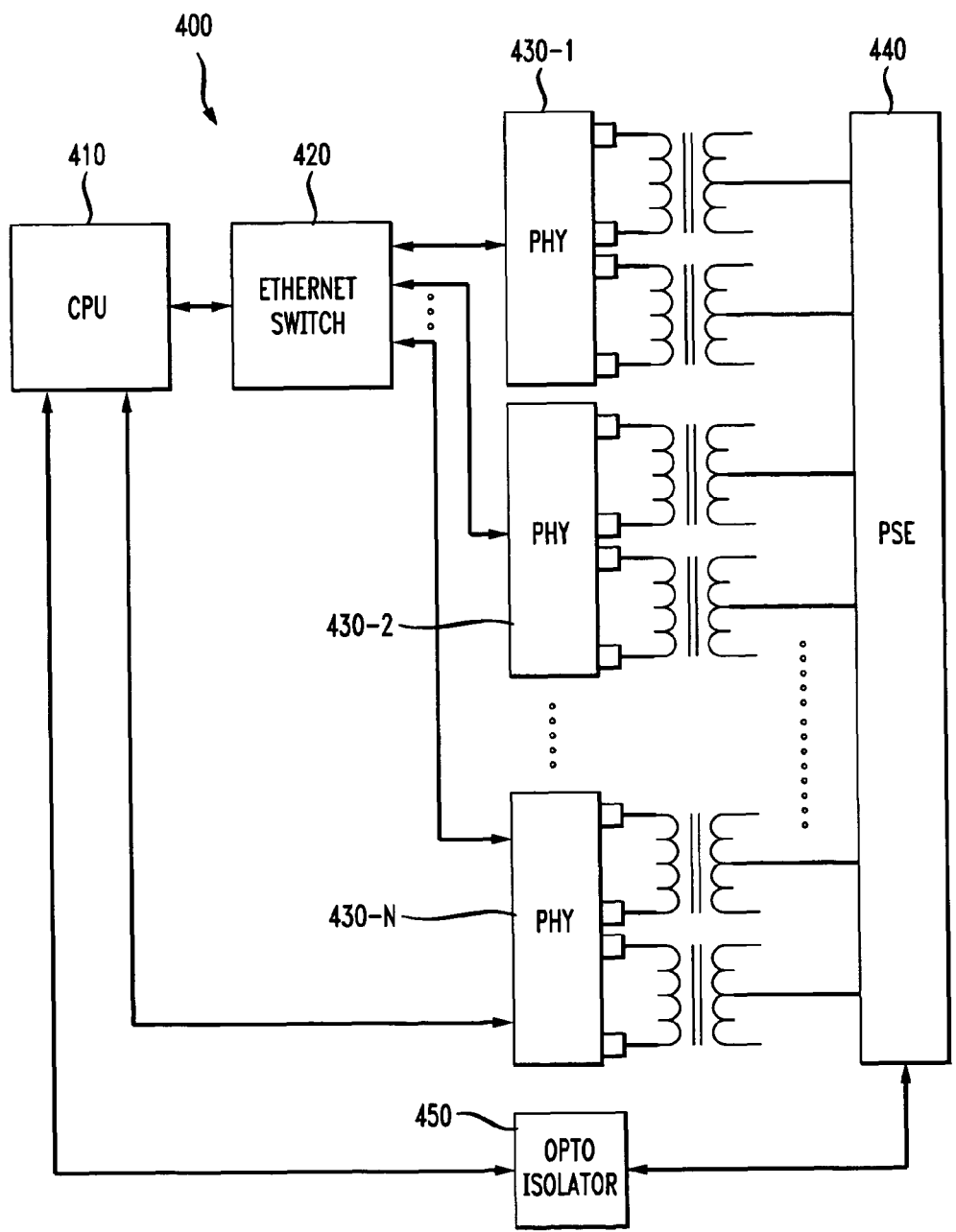
FIG. 4 illustrates an embodiment of a PoE system that enables communication of cable characteristic information from a PHY to a PSE.

FIG. 4 illustrates an embodiment of a PoE environment 400 in which the principles of the present invention can be implemented. As illustrated, environment 400 includes PHYs 430-1 to 430-N that are each connected to Ethernet switch 420. While a PHY can include one or more Ethernet transceivers, the wiring for only a single transceiver is illustrated as being connected to PHY 430-N. Each PHY is also connected to CPU 410, although only a single connection from CPU 410 to PHY 430-N is shown for simplicity. In one embodiment, CPU 410 is incorporated along with Ethernet switch 420 and PHYs 410-1 to 410-N on a single chip. In another embodiment, Ethernet switch 420 and PHYs 410-1 to 410-N are incorporated on a single chip separate from CPU 410, wherein communication with CPU 410 is enabled via a serial interface. Also illustrated in PoE environment 400 is a PSE 440 that provides power through the center taps of the transformers shown. As illustrated, PSE 440 is also coupled to CPU 410. In one embodiment, PSE 440 is coupled to CPU 410 via opto-isolator 450 that facilitates an isolation boundary.

Figure 5:
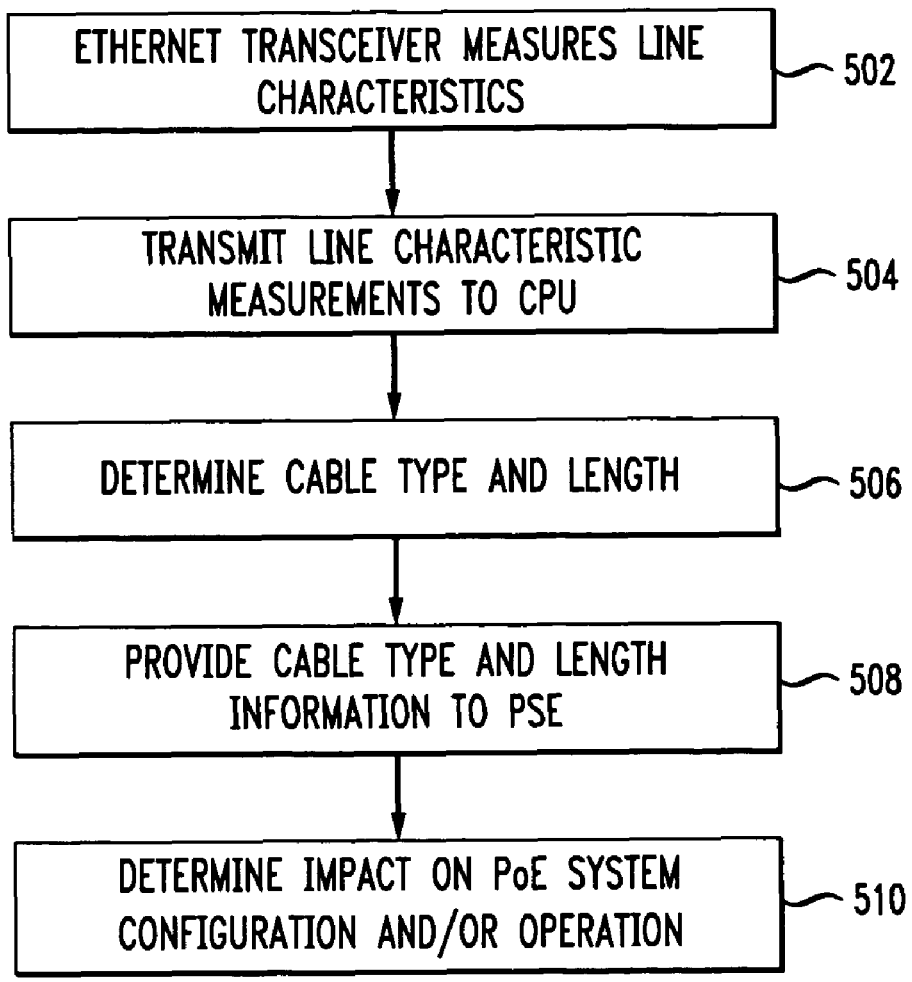
FIG. 5 illustrates a flowchart of a process for communicating cable characteristic information from a PHY to a PSE.

To illustrate the operation of PoE environment 400 in implementing the principles of the present invention, reference is now made to the flowchart of FIG. 5. As illustrated, the flowchart of FIG. 5 begins at step 502 where a transceiver in PHY 430-N measures line characteristics of an Ethernet cable coupled to PHY 430-N. In one embodiment, measurements that enable a determination of insertion loss, cross talk, and cable length are taken during an echo canceller convergence process performed by an echo canceller module under control of CPU 410. Line characteristic measurements taken by the transceiver are then transmitted to CPU 410 at step 504.

Next, at step 506, CPU 410 uses the line characteristic measurement data to determine the cable type and cable length. This cable type and length information is subsequently provided to PSE 440 at step 508. Here, it should be noted that PSE can also be configured to determine the cable type and length using the line characteristic measurement data.

Regardless of where the cable type and length is determined, its availability to PSE 440 would enable PSE 440 to determine its impact on the PoE system configuration and/or operation. This impact determination can consider the cable type and length, and hence resistance of the cable, in combination with other PoE system parameters such as $V_{PSE}$, $P_L$, $V_L$, etc. As would be appreciated, the impact analysis can be performed by any system element that is responsible for diagnosing the Ethernet cable, determining an adjustment to a power budget for a given PSE port, etc. In general, the impact analysis can be based on one or more parameters such as the cable link resistance, cable current, $V_{PSE}$, $P_L$, $V_L$, that can either be communicated, discovered, or assumed by the appropriate system element. For example, one or more parameters can be based on a system specification, derived through one or more calculations using measurement data (e.g., cable resistance derived from determined cable type and length), or received from another system element with knowledge of such a parameter (e.g., $V_L$ communicated to the PSE by the PD).

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A power over Ethernet system that allocates individual power budgets for each of a plurality of powered devices that are coupled to a power source equipment via a corresponding plurality of power source equipment ports, comprising:

a first cable detection component that measures one or more electrical characteristics of a first Ethernet cable that couples a first of said plurality of powered devices to a first of said plurality of power source equipment ports, said first Ethernet cable having a length that is less than 100 meters;

a second cable detection component that measures one or more electrical characteristics of a second Ethernet cable that couples a second of said plurality of powered devices to a second of said plurality of power source equipment ports, said second Ethernet cable having a length that is between 300 and 500 meters; and a power controller that controls an allocation of a total power budget amongst said plurality of power source equipment ports by an assignment of an individual power budget to each of said plurality of power source equipment ports, said allocation of said total power budget being based on a first individual power budget that accounts for a first power loss determined for said first Ethernet cable having a length less than 100 meters using said one or more measured electrical characteristics of said first Ethernet cables, and on a second individual power budget that accounts for a second power loss determined for said second Ethernet cable having a length between 300 and 500 meters using said one or more measured electrical characteristics of said second Ethernet cable.

2. The power over Ethernet system of claim 1, wherein said individual power budgets are determined using an Ethernet cable type.

3. The power over Ethernet system of claim 2, wherein said individual power budgets are determined using an Ethernet cable length.

4. The power over Ethernet system of claim 1, wherein said power controller controls an allocation of power based on a calculated Ethernet cable resistances.

5. The power over Ethernet system of claim 1, wherein said power controller identifies power budgets allocated to each of said plurality of power source equipment ports.

6. The power over Ethernet system of claim 1, wherein a power allocation is changed through an adjustment to a current limit.

7. A power over Ethernet method in a system that supplies power to a plurality of powered devices via a plurality of ports in a power source equipment, comprising:

upon connection of a first powered device to a first power source equipment port via a first Ethernet cable that is less than 100 meters, measuring one or more electrical characteristics of said first Ethernet cable;

determining a first individual power budget for said first power source equipment port using said one or more electrical measurements of said first Ethernet cable;

upon connection of a second powered device to a second power source equipment port via a second Ethernet cable that is between 300 and 500 meters, measuring one or more electrical characteristics of said second Ethernet cable;

determining, prior to an allocation of power to said second power source equipment port, a second individual power budget for said second power source equipment port using said one or more electrical measurements of said second Ethernet cable, wherein said second individual power budget is greater than 15.4 W and accounts for a cable power loss that is attributable to said second Ethernet cable that is between 300 and 500 meters;

controlling an assignment of portions of a total power budget available to said power sourcing equipment to said plurality of power source equipment ports, wherein said control equipment port and an assignment of said second individual power budget to said second power source equipment port; and powering said first powered device over said first Ethernet cable that is less than 100 meters and said second powered device over said second Ethernet cable that is between 300 and 500 meters.

8. The method of claim 7, wherein said determining said second individual power budget is based on an identified length of said second Ethernet cable.

9. The method of claim 7, wherein said determining said second individual power budget is based on an identified type of said second Ethernet cable.

10. The method of claim 7, wherein said determining said second individual power budget is based on a determined resistance of said second Ethernet cable.

11. The method of claim 7, wherein said controlling comprises setting a current limit for a power source equipment port.

* * * * *